United States Patent
Teramoto et al.

(10) Patent No.: US 10,633,548 B2
(45) Date of Patent: *Apr. 28, 2020

(54) INK COMPOSITION AND RECORDING METHOD

(71) Applicant: Seiko Epson Corporation, Tokyo (JP)

(72) Inventors: Ryosuke Teramoto, Matsumoto (JP); Yukiko Ii, Suwa (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 9 days.

This patent is subject to a terminal disclaimer.

(21) Appl. No.: 15/891,773

(22) Filed: Feb. 8, 2018

(65) Prior Publication Data

US 2018/0265722 A1    Sep. 20, 2018

(30) Foreign Application Priority Data

Mar. 14, 2017  (JP) ................. 2017-048252

(51) Int. Cl.
| | | |
|---|---|---|
| *C09D 11/00* | (2014.01) | |
| *C09D 11/322* | (2014.01) | |
| *C09D 11/03* | (2014.01) | |
| *C09D 11/107* | (2014.01) | |
| *C09D 11/106* | (2014.01) | |
| *C09D 11/38* | (2014.01) | |

(52) U.S. Cl.
CPC ............ *C09D 11/322* (2013.01); *C09D 11/03* (2013.01); *C09D 11/106* (2013.01); *C09D 11/107* (2013.01); *C09D 11/38* (2013.01)

(58) Field of Classification Search
CPC ....... C09D 11/03; C09D 11/38; C09D 11/322; C09D 11/106; C09D 11/107
USPC ........................................................ 523/160
See application file for complete search history.

(56) References Cited

U.S. PATENT DOCUMENTS

| | | |
|---|---|---|
| 5,851,274 A | 12/1998 | Lin |
| 5,969,003 A | 10/1999 | Foucher et al. |
| 6,294,592 B1 | 9/2001 | Herrmann et al. |
| 6,488,753 B1 * | 12/2002 | Ito ........................ C09D 11/324 |
| | | 106/31.86 |
| 6,666,914 B2 | 12/2003 | Hayashi et al. |
| 2001/0020431 A1 | 9/2001 | Osumi et al. |
| 2002/0054187 A1 | 5/2002 | Kato et al. |
| 2004/0082686 A1 | 4/2004 | Takahashi et al. |
| 2007/0037901 A1 | 2/2007 | Kanaya et al. |
| 2010/0033522 A1 * | 2/2010 | Saito .................... C09D 11/322 |
| | | 347/9 |
| 2011/0234689 A1 | 9/2011 | Saito |
| 2013/0216794 A1 | 8/2013 | Takeda |
| 2013/0295501 A1 | 11/2013 | Zhang et al. |
| 2018/0187031 A1 * | 7/2018 | Teramoto ................. B41J 2/175 |
| 2018/0298214 A1 * | 10/2018 | Takahashi ............ C09D 11/033 |

FOREIGN PATENT DOCUMENTS

| | | |
|---|---|---|
| EP | 1 010 736 A1 | 6/2000 |
| JP | 03-006270 A | 1/1991 |
| JP | 2001-164158 A | 6/2001 |
| JP | 4803356 B2 | 10/2011 |

OTHER PUBLICATIONS

The Engineering Toolbox Viscosity Conversion Chart, https://www.engineeringtoolbox.com/viscosity-converter-d413.html, which is appended, downloaded Sep. 26, 2018 (Year: 2018).
U.S. Appl. No. 15/950,540, filed Apr. 11, 2018, Takuya Takahashi.

* cited by examiner

*Primary Examiner* — Hannah J Pak
(74) *Attorney, Agent, or Firm* — Harness, Dickey & Pierce, P.L.C.

(57) ABSTRACT

An ink composition contains water, at least one surfactant, and a pigment. The pigment has a specific surface area of 10 $m^2/g$ or more and 50 $m^2/g$ or less as determined by pulsed NMR at 30° C.

4 Claims, No Drawings

INK COMPOSITION AND RECORDING METHOD

BACKGROUND

1. Technical Field

The present invention relates to an ink composition and a recording method.

2. Related Art

Ink jet recording, with which high-definition images can be recorded with relatively simple equipment, has been making rapid progress in various fields. Along with this, many studies have been done for more stable production of high-quality prints.

For example, JP-A-3-6270 discloses a mixture for ink jet recording inks that contains, as an essential component, a crosslinked polymer latex that has an average particle diameter of 200 nm or less and exhibits a spin-lattice relaxation time (T_1) of 1.2 seconds or less as measured by NMR.

While the ink jet printing market is going to demand higher speeds and higher durability, the known, pigment-containing ink compositions need to be further improved in several points, such as dispersion stability of the pigment in the ink and the control of coarse pigment particles that form as water evaporates, to achieve higher levels of print stability.

SUMMARY

An advantage of an aspect of the invention is that it provides an ink composition that achieves a high level of print stability when used with an ink jet recording apparatus that needs to be fast in printing and highly durable.

After extensive research to solve the above problem, the inventors found that when an ink composition contains water, a surfactant, and a pigment and the specific surface area of the pigment falls within a certain range, a high level of print stability is attained. The present invention is based on these findings.

That is, an aspect of the invention is an ink composition that contains water, at least one surfactant, and a pigment. The specific surface area of the pigment as determined by pulsed NMR at 30° C. is 10 m$^2$/g or more and 50 m$^2$/g or less. A possible but not the only reason why such an ink composition solves the problem intended in the present invention is as follows. When an ink composition according to an aspect of the invention is ejected, for example by ink jetting, the water in the ink composition evaporates on the surface of the ejection nozzles. Even after the evaporation of water, the pigment in the ink composition remains stably dispersed, with higher stability than in known ink compositions. More specifically, the possible formation of agglomerates in the ink composition following the evaporation of water is limited, ensuring superior ejection stability and a high level of print stability. The improved dispersion stability of the pigment owes to the fact that the average particle diameter of the pigment dispersed in the water-containing ink composition and the amount of water-soluble group introduced to the surface of the pigment fall within appropriate ranges, primarily because of the specific surface area of the pigment being 10 m$^2$/g or more and 50 m$^2$/g or less.

Pulsed NMR-based computation of the specific surface area of a pigment, unlike the commonly used BET-based measurement, gives the specific surface area even of a pigment in a liquid ink composition containing a surfactant; is easy and convenient to perform; and is feasible even in the presence of interactions between the surfactant, water, and the pigment in the ink composition. That is, in the determination of the specific surface area of a pigment, pulsed NMR-based computation is superior to the commonly used BET-based measurement. As such, making the specific surface area of a pigment as determined by pulsed NMR fall within a particular range provides precise control of the average particle diameter of the pigment and the amount of water-soluble group introduced to the surface of the pigment to within appropriate ranges and therefore is a way to achieve a high level of print stability.

For the ink composition according to an aspect of the invention, it is preferred that the at least one surfactant include a nonionic surfactant that satisfies relation (1):

$$0.15 \leq H - (Sp \times 0.25) \leq 3.75 \quad (1)$$

(where H denotes the HLB of the nonionic surfactant, and Sp denotes the specific surface area, m$^2$/g, of the pigment).

When the ink composition contains a nonionic surfactant with an HLB that satisfies relation (1), the surfactant improves the dispersion of the pigment in any solvent other than water in the ink composition. During the ejection of the ink composition by ink jetting, therefore, the formation of coarse pigment particles following the evaporation of water from the ink composition on the surface of the nozzles is further reduced. As a result, higher ejection stability and a higher level of print stability are attained.

For the ink composition according to an aspect of the invention, it is preferred that the ink composition further contain resin particles, and that the specific surface area of the resin particles as determined by pulsed NMR at 30° C. satisfy relation (2):

$$1.75 \leq Sr - (Sp \times 0.75) \leq 26.75 \quad (2)$$

(where Sr denotes the specific surface area, m$^2$/g, of the resin particles, and Sp denotes the specific surface area, m$^2$/g, of the pigment).

When the ink composition contains resin particles with a specific surface area that satisfies relation (2), the resin particles improves the dispersion of the pigment in any solvent other than water in the ink composition. Furthermore, such resin particles are unlikely to aggregate into coarse particles. During the ejection of the ink composition by ink jetting, therefore, the formation of coarse pigment particles following the evaporation of water from the ink composition on the surface of the nozzles is further reduced, and the resin is also unlikely to form coarse particles. As a result, higher ejection stability and a higher level of print stability are attained.

Another aspect of the invention is a recording method that includes attaching an ink composition according to an aspect of the invention, described above, to a substrate.

Owing to the high level of print stability, this method gives high-quality prints, without missing dots or displacement. When the ink composition contains the aforementioned resin particles, furthermore, the resulting prints are also superior in fastness.

DESCRIPTION OF EXEMPLARY EMBODIMENTS

The following describes some embodiments of the invention (hereinafter each simply referred to as "an embodiment") in detail. No aspect of the invention is limited to these embodiments, and various modifications can be made without departing from the scope of that aspect of the invention. The term "(meth)acrylic resin" as used herein includes both an acrylic resin and the corresponding methacrylic resin.

Ink Composition

An ink composition according to an embodiment contains water, at least one surfactant, and a pigment. The specific surface area of the pigment in the ink composition as determined by pulsed NMR at 30° C. (hereinafter also simply referred to as "the specific surface area of the pigment") is 10 $m^2$/g or more and 50 $m^2$/g or less.

A possible but not the only reason why the use of such an ink composition leads to a high level of print stability is as follows. When an ink composition according to this embodiment is ejected, for example by ink jetting, the water in the ink composition evaporates on the surface of the ejection nozzles. Even after the evaporation of water, the pigment in the ink composition remains stably dispersed, with higher stability than in known ink compositions. More specifically, the possible formation of agglomerates in the ink composition following the evaporation of water is limited, ensuring superior ejection stability and a high level of print stability. The improved dispersion stability of the pigment owes to the fact that the average particle diameter of the pigment dispersed in the water-containing ink composition and the amount of water-soluble group introduced to the surface of the pigment fall within appropriate ranges, primarily because of the specific surface area of the pigment being 10 $m^2$/g or more and 50 $m^2$/g or less.

Pigment

A possible way to adjust the specific surface area of the pigment in the ink composition to within the above range according to this embodiment is to adjust the average particle diameter of and the amount of introduced water-soluble group in the pigment during the preparation of the pigment dispersion to be used in the ink composition.

An ink composition according to this embodiment contains a pigment. Pigments are not easily discolored even when exposed to light, gases, or other sources of discoloration. Thus, prints produced using a pigment as a colorant tend to be superior in the fastness of the image thereon, such as waterfastness and fastness to highlighters, compared with those produced using colorants other than pigments, i.e., dyes.

If a pigment is used in an ink composition, it is preferred that the pigment keep stably dispersed in water. There are several ways to achieve this, such as dispersion using resin dispersant(s), i.e., dispersing the pigment using a water-soluble resin and/or a water-dispersible resin (a pigment dispersed by this method is hereinafter referred to as "a resin-dispersed pigment"), dispersion using surfactant(s), i.e., dispersing the pigment using a water-soluble surfactant and/or a water-dispersible surfactant (a pigment dispersed by this method is hereinafter referred to as "a surfactant-dispersed pigment"), and dispersing and/or solubilizing the pigment by chemically or physically introducing water-soluble groups to the surface of the pigment rather than by using resin dispersants, surfactants, or any other dispersant (a pigment dispersed and/or solubilized by this method is hereinafter referred to as "a self-dispersible pigment"). In this embodiment, the ink composition can contain any of a resin-dispersed pigment, a surfactant-dispersed pigment, and a self-dispersible pigment. Where necessary, a mixture of two or more of these pigments can be used.

In this embodiment, if the ink composition is used with an ink jet recording apparatus that needs to be fast in printing and highly durable, it is preferred that the pigment be a self-dispersible pigment, among the above-described resin-dispersed, surfactant-dispersed, and self-dispersible pigments.

A self-dispersible pigment is, as mentioned above, a pigment that disperses and/or dissolves in an aqueous medium without requiring a dispersant. The expression "disperses and/or dissolves in an aqueous medium without requiring a dispersant" describes the state in which the pigment is present stably in the aqueous medium without a dispersant, owing to the water-soluble groups the pigment has on its surface.

Ink compositions that contain a self-dispersible pigment as a colorant require no dispersant, which would usually be needed to disperse the pigment. Prepared without a dispersant, which would affect the ability to break foam, such ink compositions scarcely foam and therefore tend to be superior in ejection stability. The formation of dispersant-derived dry substance at the gas-liquid interface is prevented, ensuring superior ejection reliability. This type of ink composition, furthermore, is free from the dispersant-related significant increase in viscosity. This means that this type of ink composition can contain a larger amount of pigment than the other types can, and, as a result, the print density of this type of ink composition can be sufficiently high.

In this embodiment, self-dispersible pigments that can be used in the ink composition are those having one or more kinds of water-soluble groups on the surface of the pigment. The one or more kinds of water-soluble groups are selected from the group consisting of —OM, —COOM, —CO—, —$SO_3$M, —$SO_2$M, —$SO_2NH_2$, —$RSO_2$M, —$PO_3$HM, —$PO_3M_2$, —$SO_2$NHCOR, —$NH_3$, and —$NR_3$ (in the formulae, M denotes hydrogen, an alkali metal, ammonium, or an organic ammonium, and R denotes alkyl having 1 to 12 carbon atoms or substituted or unsubstituted naphthyl).

A self-dispersible pigment for the ink composition is produced by, for example, joining (grafting) water-soluble groups to the surface of a pigment through a physical or chemical treatment of the pigment. An example of a physical treatment is vacuum plasma treatment. An example of a chemical treatment is wet oxidation, in which a substance is oxidized in water using an oxidizer. The specific surface area of the pigment in this case can be controlled by adjusting the amount of water-soluble group introduced to the surface of the pigment in this process.

In this embodiment, it is preferred to use a self-dispersible pigment that has a surface treated through oxidation with a hypohalous acid and/or a hypohalite, oxidation with ozone, or oxidation with persulfuric acid and/or a persulfate. Such a self-dispersible pigment has high coloring power. By adjusting the type(s) and concentration(s) of the oxidizer(s) used in the oxidation process, the amount of water-soluble group introduced to the surface of the pigment, and therefore the specific surface area of the pigment, can be controlled.

The pigment used in this embodiment can be any known pigment, including inorganic and organic pigments. Examples include, but are not limited to, those that follow. A combination of two or more pigments can also be used.

Examples of carbon blacks used in black inks include, but are not limited to, Bonjet Black CW-1 (Orient Chemical Industries), No. 2300, No. 900, MCF88, No. 33, No. 40, No. 45, No. 52, MA7, MA8, MA100, and No. 2200B (Mitsubishi Chemical Corporation), Raven 5750, Raven 5250, Raven 5000, Raven 3500, Raven 1255, and Raven 700 (Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (Degussa).

Examples of pigments used in white inks include, but are not limited to, C.I. Pigment White 6, 18, and 21, titanium oxide, zinc oxide, zinc sulfide, antimony oxide, and zirconium oxide, and white hollow resin particles and polymer particles.

Examples of pigments used in yellow inks include, but are not limited to, EMACOL SF Yellow J701F (a trade name of a product of Sanyo Color Works) and C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments used in magenta inks include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of pigments used in cyan inks include, but are not limited to, C.I. Pigment Blue 1, 2, 3, 15, 15:1, 15:2, 15:3, 15:34, 15:4, 16, 18, 22, 25, 60, 65, and 66, C.I. Vat Blue 4 and 60, and C.I. Direct Blue 199.

Examples of other pigments include, but are not limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

In this embodiment, it is preferred that the average particle diameter (D50) of the pigment be between 5 nm and 400 nm, more preferably between 30 nm and 300 nm, even more preferably 50 nm and 200 nm. This is beneficial to the ejection stability of the ink composition.

The term "average particle diameter" as used herein refers to a volume-average particle diameter unless otherwise noted. Average particle diameters can be measured using a laser diffraction/scattering particle size distribution analyzer, such as a Microtrac analyzer (MicrotracBEL Corp.).

The specific surface area of the pigment in the ink composition as determined by pulsed NMR at 30° C. is 10 $m^2/g$ or more and 50 $m^2/g$ or less, preferably 15 $m^2/g$ or more and 45 $m^2/g$ or less, more preferably 20 $m^2/g$ or more and 40 $m^2/g$ or less.

The use of a pigment having a specific surface area in these ranges leads to superior print stability. The specific surface area of the pigment is determined by the method described in the Examples section.

An ink composition in which the specific surface area of a pigment falls within these ranges can be obtained by, for example, controlling the average particle diameter of the pigment and the amount of water-soluble group introduced to the surface of the pigment.

The pigment content of the ink composition is preferably 1.0% by mass or more and 15% by mass or less, more preferably 2.0% by mass or more and 10% by mass or less, even more preferably 3.0% by mass or more and 7.0% by mass or less, of the total amount of the ink composition (100% by mass). The use of such an amount of pigment tends to lead to higher print stability.

Surfactant

Examples of surfactants used in this embodiment include, but are not limited to, acetylene glycol surfactants, alkyl ether surfactants, fluorosurfactants, and silicone surfactants.

For acetylene glycol surfactants, it is preferred to use one or more selected from, but not limited to, 2,4,7,9-tetramethyl-5-decin-4,7-diol and alkylene oxide adducts thereof and 2,4-dimethyl-5-decin-4-ol and alkylene oxide adducts thereof. Examples of commercially available acetylene glycol surfactants include, but are not limited to, OLFINE 104 surfactants, OLFINE PD-001, -002W, and other PD surfactants (trade names of products of Air Products Japan, Inc.), SURFYNOL 104PG50, 465, 61, and DF110D (trade names of products of Nissin Chemical Industry Co., Ltd.). One acetylene glycol surfactant can be used alone, and a combination of two or more acetylene glycol surfactants can also be used.

As for alkyl ether surfactants, it is preferred to use one or more selected from, but not limited to, polyoxyethylene 2-ethylhexyl ether, polyoxyethylene oleyl ether, polyoxyethylene tridecyl ether, polyoxyethylene castor-oil ether, polyoxyethylene cetyl ether, polyoxyethylene stearyl ether, polyoxyethylene alkyl ethers, polyoxyalkylene alkyl ethers, and polyoxyalkylene tridecyl ethers. Examples of commercially available alkyl ether surfactants include, but are not limited to, NEWCOL 2302, 2303, 1004, 1006, 1008, 1204, 1807, and 1820 (trade names of products of Nippon Nyukazai). One alkyl ether surfactant can be used alone, and a combination of two or more alkyl ether surfactants can also be used.

Examples of fluorosurfactants include, but are not limited to, perfluoroalkyl sulfonates, perfluoroalkyl carboxylates, perfluoroalkyl phosphates, perfluoroalkyl ethylene oxide adducts, perfluoroalkyl betaines, and perfluoroalkyl amine oxides. Examples of commercially available fluorosurfactants include, but are not limited to, S-144 and S-145 (trade names, Asahi Glass Co., Ltd.); FC-170C, FC-430, and FC4430 (trade names, Sumitomo 3M Ltd.); FSO, FSO-100, FSN, FSN-100, and FS-300 (trade names, DuPont); and FT-250 and 251 (trade names, NEOS Co., Ltd.). One fluorosurfactant can be used alone, and a combination of two or more fluorosurfactants can also be used.

Examples of silicone surfactants include, but are not limited to, polysiloxane compounds and polyether-modified organosiloxanes. Specific examples of commercially available silicone surfactants include, but are not limited to, SAG503A (a trade name, Nissin Chemical Industry Co., Ltd.), BYK-306, BYK-307, BYK-333, BYK-341, BYK-345, BYK-346, BYK-347, BYK-348, and BYK-349 (trade names, BYK-Chemie) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical). One silicone surfactant can be used alone, and a combination of two or more silicone surfactants can also be used.

Among these surfactants, nonionic surfactants that satisfy relation (1) are preferred. The use of such a nonionic surfactant tends to lead to higher print stability and higher fastness of prints.

$$0.15 \leq H-(Sp \times 0.25) \leq 3.75 \quad (1)$$

(where H denotes the HLB of the nonionic surfactant, and Sp denotes the specific surface area, $m^2/g$, of the pigment).

More preferably, the lower limit to "H−(Sp×0.25)" in relation (1) is 0.55, even more preferably 1.35. The upper limit is more preferably 2.95, even more preferably 2.75.

The use of a nonionic surfactant with an HLB that satisfies relation (1) tends to lead to even higher print stability and even higher fastness of prints. The HLB of the nonionic surfactant is calculated by Griffin's method.

Nonionic surfactants with an HLB that satisfies relation (1) can be selected from, for example, the surfactants listed above or from commercially available nonionic surfactants.

The surfactant content is preferably 0.05% by mass or more and 2.5% by mass or less, more preferably 0.05% by mass or more and 1.5% by mass or less, of the total amount of the ink composition (100% by mass). The use of such an amount of surfactant tends to lead to higher print stability and higher fastness of prints.

Resin Particles

In this embodiment, it is preferred that the ink composition further contain resin particles. As the ink composition dries, the resin particles fuse with one another and with the coloring component, firmly binding the pigment to the substrate. This improves the fixation of the image portion of the resulting prints, enhancing the fastness of the image on the prints. The resin particles in the ink composition may be present in the form of an emulsion.

The term emulsion as used herein refers to a mixture obtained by dispersing, in the liquid medium in the ink composition, fine particles of a resin component that is hardly soluble or insoluble in the liquid medium.

The use of resin particles in the form of an emulsion in the ink composition tends to help adjust the viscosity of the ink composition to within a range suitable for ink jet recording and make the ink composition superior in storage stability and ejection stability.

In this embodiment, the resin particles can be resin particles of self-dispersible type that incorporate a water-soluble component needed for stable dispersion in water (self-dispersible resin particles) or resin particles that are rendered dispersible in water with the use of an external emulsifier. It is preferred that the resin particles be of self-dispersible type. With such resin particles, the ink composition will be of low viscosity and superior in ejection stability.

Examples of resins that can be used include (meth)acrylic, styrene acrylic, fluorene, urethane, polyolefin, rosin-modified, terpene, polyester, polyamide, epoxy, vinyl chloride, vinyl chloride-vinyl acetate, and ethylene-vinyl acetate resins. One resin can be used alone, and a combination of two or more resins can also be used. The resin(s) can be a homopolymer or a copolymer. The specific surface area of the resin particles can be adjusted by selecting appropriate resin(s).

In this embodiment, the resin particles may be simple particles or core-shell particles, which have a core and a shell. The term "core-shell" as used herein refers to "any structure in which two or more polymers with different compositions exist as separate phases in the particles," thus including the structure in which the shell covers part of the core as well as the structure in which the shell completely covers the core. The shell polymer may have a domain, or anything similar, inside the core particle. There may be between the core and the shell one or more layers with compositions different from those of the core and the shell, forming a multilayer structure composed of three or more layers.

The resin particles that may be used in this embodiment can be obtained through the known emulsification polymerization process, i.e., emulsification polymerization of an unsaturated vinyl monomer in water in the presence of a polymerization catalyst and an emulsifier. By adjusting the polymerization conditions, the degree of polymerization of the resulting resin particles, and therefore the specific surface area of the resin particles, can be controlled.

In this embodiment, it is preferred that the volume-average particle diameter (D50) of the resin particles be between 5 nm and 400 nm, more preferably between 30 nm and 300 nm, even more preferably between 50 nm and 200 nm. This is beneficial to the ejection stability of the ink composition.

If the ink composition contains resin particles, it is preferred that the specific surface area of the resin particles as determined by pulsed NMR at 30° C. (hereinafter also simply referred to as "the specific surface area of the resin particles") satisfy relation (2):

$$1.75 \leq Sr-(Sp \times 0.75) \leq 26.75 \tag{2}$$

(where Sr denotes the specific surface area, $m^2/g$, of the resin particles, and Sp denotes the specific surface area, $m^2/g$, of the pigment).

More preferably, the lower limit to "Sr−(Sp×0.75)" in relation (2) is 7.75, even more preferably 11.75. The upper limit is more preferably 21.75, even more preferably 16.75.

The use of resin particles having a specific surface area that satisfies relation (2) tends to lead to higher print stability and higher fastness of prints. The specific surface area of the resin particles is determined by the method described in the Examples section.

Resin particles that satisfy relation (2) can be obtained by, for example, controlling the average particle diameter of the resin emulsion, the type of resin particles, and the degree of polymerization of the polymer from which the resin particles are made.

The amount of the resin particles (on a solids basis) in the ink composition is preferably 0.1% by mass or more and 20% by mass or less, more preferably 0.5% by mass or more and 10% by mass or less, even more preferably 1.0% by mass or more and 5.0% by mass or less, of the total amount of the ink composition (100% by mass). The use of such an amount of resin particles tends to lead to higher print stability and higher fastness of prints.

Water

An ink composition according to this embodiment contains water. The water can be, for example, water treated to minimize ionic impurities. Examples include forms of purified water, such as ion-exchanged water, ultrafiltered water, reverse osmosis-water, and distilled water, and ultrapure water. Sterilized water, such as ultraviolet- or hydrogen peroxide-treated water, tends to further improve the storage stability of the ink composition by preventing fungal and bacterial development in the ink composition during prolonged storage.

Organic Solvent

An ink composition according to this embodiment may further contain an organic solvent. The organic solvent can be of any kind, as long as it is compatible with water.

Examples of organic solvents that can be used include, but are not limited to, cyclic nitrogen compounds, polar aprotic solvents, monoalcohols, alkyl polyols, and glycol ethers.

If the ink composition contains an organic solvent, it is preferred that the organic solvent content be 0.1% by mass or more and 40% by mass or less, more preferably 0.5% by mass or more and 30% by mass or less, of the total amount of the ink composition (100% by mass).

Besides the components discussed above, the ink composition may optionally contain additives, such as crosslinking agents, lubricants, softening agents, waxes, dissolution aids, viscosity modifiers, pH-adjusting agents, antioxidants, preservatives, antimolds, anticorrosives, and chelating agents for capturing metal ions that would affect dispersion.

Recording Method

The following describes a recording method in which an ink composition according to an embodiment is used. A recording method according to an embodiment includes attaching an ink composition according to an embodiment to a substrate (application).

In the application, droplets of an ink jet ink are ejected from an ink jet head of a printer and applied to the substrate. Ink droplets having a predetermined mass are intermittently ejected at predetermined times to adhere to the substrate, forming (recording) an intended design, such as an image, characters, a pattern, or colors.

The resulting prints, made using an ink composition according to an embodiment, are of better quality, with less missing dots and reduced displacement, and higher fastness than could be by known methods, even if the recording work requires a faster speed and higher durability than are currently required.

EXAMPLES

The following describes an aspect of the invention in more detail by providing examples. No aspect of the invention is limited to these examples.

Materials for Ink Compositions

In the printing work described below, the following materials were used as major ingredients for ink compositions.

Pigments

Pigment dispersion A (specific surface area of pigment as determined by pulsed NMR at 30° C., 31.0 m$^2$/g; average particle diameter, 120 nm)

Pigment dispersion B (specific surface area of pigment as determined by pulsed NMR at 30° C., 15.0 m$^2$/g; average particle diameter, 123 nm)

Pigment dispersion C (specific surface area of pigment as determined by pulsed NMR at 30° C., 45.0 m$^2$/g; average particle diameter, 132 nm)

Pigment dispersion D (specific surface area of pigment as determined by pulsed NMR at 30° C., 10.0 m$^2$/g; average particle diameter, 130 nm)

Pigment dispersion E (specific surface area of pigment as determined by pulsed NMR at 30° C., 50.0 m$^2$/g; average particle diameter, 127 nm)

Pigment dispersion F (specific surface area of pigment as determined by pulsed NMR at 30° C., 5.0 m$^2$/g; average particle diameter, 131 nm)

Pigment dispersion G (specific surface area of pigment as determined by pulsed NMR at 30° C., 55.0 m$^2$/g; average particle diameter, 133 nm)

Surfactants

NEWCOL 1820 (a trade name of a product of Nippon Nyukazai; HLB, 15.3; polyoxyethylene stearyl ether)

NEWCOL 1008 (a trade name of a product of Nippon Nyukazai; HLB, 14.6; polyoxyethylene 2-ethylhexyl ether)

NEWCOL 1006 (a trade name of a product of Nippon Nyukazai; HLB, 13.4; polyoxyethylene 2-ethylhexyl ether)

NEWCOL 1004 (a trade name of a product of Nippon Nyukazai; HLB, 11.5; polyoxyethylene 2-ethylhexyl ether)

NEWCOL 1807 (a trade name of a product of Nippon Nyukazai; HLB, 10.7; polyoxyethylene stearyl ether)

NEWCOL 2303 (a trade name of a product of Nippon Nyukazai; HLB, 8.3; a polyoxyethylene alkyl ether)

NEWCOL 1204 (a trade name of a product of Nippon Nyukazai; HLB, 7.9; polyoxyethylene oleyl ether)

NEWCOL 2302 (a trade name of a product of Nippon Nyukazai; HLB, 6.3; a polyoxyethylene alkyl ether)

OLFINE PD-002W (a trade name of a product or Air Products Japan, Inc.; HLB, 9 to 10)

SURFYNOL 104PG50 (a trade name of Nisshin Chemical Industry Co., Ltd.; HLB, 4)

Resin Particles

Resin particles A (specific surface area as determined by pulsed NMR at 30° C., 35.0 m$^2$/g; average particle diameter, 80 nm)

Resin particles B (specific surface area as determined by pulsed NMR at 30° C., 31.0 m$^2$/g; average particle diameter, 78 nm)

Resin particles C (specific surface area as determined by pulsed NMR at 30° C., 45.0 m$^2$/g; average particle diameter, 91 nm)

Resin particles D (specific surface area as determined by pulsed NMR at 30° C., 25.0 m$^2$/g; average particle diameter, 88 nm)

Resin particles E (specific surface area as determined by pulsed NMR at 30° C., 50.0 m$^2$/g; average particle diameter, 84 nm)

Resin particles F (specific surface area as determined by pulsed NMR at 30° C., 20.0 m$^2$/g; average particle diameter, 81 nm)

Resin particles G (specific surface area as determined by pulsed NMR at 30° C., 55.0 m$^2$/g; average particle diameter, 79 nm)

Water

Purified Water

Pigment Dispersions

Preparation of the Pigment Dispersions

Pigment Dispersions A to H

Twenty grams of S170 (a trade name of a product of Degussa), a commercially available carbon black, was mixed into 500 g of water and dispersed using a household mixer for 5 minutes. The resulting liquid was put into a 3-L glass vessel fitted with a stirrer, and a gas containing 8% by mass ozone was introduced at 500 mL/min with stirring. The ozone was generated using a Permelec Electrode electrolysis ozonizer. It should be noted that the duration of gas introduction can be adjusted between 1 minute and 1 hour to provide an intended surface modification. The resulting stock dispersion was filtered through GA-100 glass fiber filter paper (a trade name, Advantec Toyo Kaisha), and the residue was concentrated to a solids concentration of 20% by mass, during which a 0.1 N solution of potassium hydroxide to a pH of 9. In this way, self-dispersible pigment dispersion A was obtained. Self-dispersible pigment dispersions B to H were obtained in the same way, except that the concentration of the ozone-containing gas and the duration of gas introduction were changed as desired. The average particle diameters presented above are volume-average particle diameters (D50) determined from the particle size distributions in the individual pigment dispersions as measured using Microtrac MT3100II (MicrotracBEL Corp.).

Specific Surface Area of Pigment

For each of these pigment dispersions, pulsed NMR measurements were taken under the following conditions, and the specific surface area of pigment [m$^2$/g] was determined from the measurements according to the equation below.

Measurement Conditions

Pulsed NMR system: Xigo Nanotools Acorn Drop

Measurement temperature: 30° C.

Sample volume: 0.5 mL

Sample A1: The pigment dispersion

Sample A2: Supernatant from the centrifugation (415,000 g×60 minutes, 25° C.) of sample A1

$$Sp=\{[Rav/Rb-1]\times Rb\}/(0.0016\times \Psi p)$$

(where Sp denotes the specific surface area, m²/g, of the pigment in the pigment dispersion, Rav an inverse of a pulsed NMR measurement from sample A1, and Rb an inverse of a pulsed NMR measurement from sample A2. The term Ψp was calculated according to the equation below)

$$\Psi p = (Sc/Sd)/[(1-Sc)/Td]$$

(where Sc denotes the solids content, % by mass, of sample A1 attributable to the pigment, Sd the density of the pigment in sample A1, and Td the density of sample A2, the supernatant)

Sc, the solids content attributable to the pigment, Sd, the density of the pigment (approximately 1.7 for carbon black), and Td, the density of the supernatant (1.0 for water), were all calculated from the formulation of the pigment dispersion.

Preparation of Resin Particles
Resin Particles A to J

A reactor equipped with a stirrer, a reflux condenser, a dispenser, and a thermometer was charged with 900 g of ion-exchanged water and 1 g of sodium lauryl sulfate, and then was heated to 70° C. with stirring and nitrogen purge. With the inner temperature maintained at 70° C., 4 g of potassium persulfate as polymerization initiator was added and dissolved, and an emulsion was continuously added dropwise to the reaction solution over 4 hours. The emulsion was prepared beforehand by adding 20 g of acrylamide, 365 g of styrene, 545 g of butyl acrylate, and 30 g of methacrylic acid to 450 g of ion-exchanged water and 3 g of sodium lauryl sulfate with stirring. After the addition of the emulsion, the mixture was aged for 3 hours. The resulting sample was allowed to cool to room temperature, and then ion-exchanged water and an aqueous solution of sodium hydroxide were added to a solids content of 40% by mass and a pH of 8. In this way, an emulsion of resin particles A was obtained. Emulsions of resin particles B to J were obtained in the same way, except that the sodium lauryl sulfate, acrylamide, styrene, butyl acrylate, and methacrylic acid loading levels were changed as desired. The average particle diameters presented above are volume-average particle diameters (D50) determined from the particle size distributions in the individual types of resin particles as measured using Microtrac MT3100II (a trade name of a product of MicrotracBEL Corp.).

Specific Surface Area of Resin Particles

For each type of resin particles, pulsed NMR measurements were taken under the following conditions, and the specific surface area [m²/g] was determined from the measurements according to the equation below.

Measurement Conditions
  Pulsed NMR system: Xigo Nanotools Acorn Drop
  Measurement temperature: 30° C.
  Sample volume: 0.5 mL (an emulsion with a solids content of 40% by mass)
  Sample B1: The resin particles, in the form of an emulsion
  Sample B2: Supernatant from the centrifugation (415,000 g×60 minutes, 25° C.) of sample B1

$$Sr = \{[Rav/Rb-1] \times Rb\}/(0.0016 \times \Psi p)$$

(where Sr denotes the specific surface area, m²/g, of the resin particles in the resin emulsion, Rav an inverse of a pulsed NMR measurement from sample B1, and Rb an inverse of a pulsed NMR measurement from sample B2. The term Ψp was calculated according to the equation below)

$$\Psi p = (Sc/Sd)/[(1-Sc)/Td]$$

(where Sc denotes the solids content, % by mass, of sample B1 attributable to the resin particles, Sd the density of the resin particles in sample B1, and Td the density of sample B2, the supernatant)

Sc, the solids content attributable to the resin, Sd, the density of the resin (approximately 0.9 for resin), and Td, the density of the supernatant (1.0 for water), were all calculated from the formulation of the ink composition.

Preparation of Ink Compositions

Materials were mixed in accordance with the formulation specified in Table 1 or 2, and the mixture was thoroughly stirred to give an ink composition. In Tables 1 and 2, the numeric values for the materials are amounts in % by mass on a solid basis, and the total is 100.0% by mass for each Example or Comparative Example.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion A | 6.0 | 6.0 | 6.0 | 6.0 | 6.0 | 6.0 | 6.0 | 6.0 | — | — | — | — |
| Pigment dispersion B | — | — | — | — | — | — | — | — | 6.0 | — | — | — |
| Pigment dispersion C | — | — | — | — | — | — | — | — | — | 6.0 | 6.0 | 6.0 |
| Pigment dispersion D | — | — | — | — | — | — | — | — | — | — | — | — |
| Pigment dispersion E | — | — | — | — | — | — | — | — | — | — | — | — |
| Pigment dispersion F | — | — | — | — | — | — | — | — | — | — | — | — |
| Pigment dispersion G | — | — | — | — | — | — | — | — | — | — | — | — |
| NEWCOL 1820 (HLB: 15.3) | — | — | — | — | — | — | — | — | — | — | — | — |
| NEWCOL 1008 (HLB: 14.6) | — | — | — | — | — | — | — | — | — | — | — | — |
| NEWCOL 1006 (HLB: 13.4) | — | — | — | — | — | — | — | — | — | 0.5 | 0.5 | 0.5 |
| NEWCOL 1004 (HLB: 11.5) | — | — | — | — | — | — | — | — | — | — | — | — |
| NEWCOL 1807 (HLB: 10.7) | — | — | — | — | — | — | — | — | — | — | — | — |
| OLFINE PD-002W (HLB: 9 to 10) | 0.5 | 0.5 | 0.5 | 0.5 | 0.5 | 0.5 | 0.5 | 0.5 | — | — | — | — |
| NEWCOL 2303 (HLB: 8.3) | — | — | — | — | — | — | — | — | — | — | — | — |
| NEWCOL 1204 (HLB: 7.9) | — | — | — | — | — | — | — | — | — | — | — | — |
| NEWCOL 2302 (HLB: 6.3) | — | — | — | — | — | — | — | — | 0.5 | — | — | — |
| SURFYNOL 104PG50 (HLB: 4) | — | — | — | — | — | — | — | — | — | — | — | — |
| Resin particles A | 2.0 | — | — | — | — | — | — | — | — | — | — | 2.0 |
| Resin particles B | — | 2.0 | — | — | — | — | — | — | — | — | — | — |
| Resin particles C | — | — | 2.0 | — | — | — | — | — | — | — | — | — |
| Resin particles D | — | — | — | 2.0 | — | — | — | — | — | 2.0 | — | — |
| Resin particles E | — | — | — | — | 2.0 | — | — | — | — | — | 2.0 | — |
| Resin particles F | — | — | — | — | — | 2.0 | — | — | — | — | — | — |
| Resin particles G | — | — | — | — | — | — | 2.0 | — | — | — | — | — |
| Glycerol | 15.0 | 15.0 | 15.0 | 15.0 | 15.0 | 15.0 | 15.0 | 15.0 | 15.0 | 15.0 | 15.0 | 15.0 |

TABLE 1-continued

|  | Examples | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Triethylene glycol monobutyl ether | 8.0 | 8.0 | 8.0 | 8.0 | 8.0 | 8.0 | 8.0 | 8.0 | 8.0 | 8.0 | 8.0 | 8.0 |
| Triethanolamine | 1.0 | 1.0 | 1.0 | 1.0 | 1.0 | 1.0 | 1.0 | 1.0 | 1.0 | 1.0 | 1.0 | 1.0 |
| Purified water | Balance | Balance | Balance | Balance | Balance | Balance | Balance | Balance | Balance | Balance | Balance | Balance |
| Sp (specific surface area of the pigment, $m^2/g$) | 31.0 | 31.0 | 31.0 | 31.0 | 31.0 | 31.0 | 31.0 | 31.0 | 15.0 | 45.0 | 45.0 | 45.0 |
| H (HLB of the nonionic surfactant) | 9 to 10 | 9 to 10 | 9 to 10 | 9 to 10 | 9 to 10 | 9 to 10 | 9 to 10 | 9 to 10 | 6.3 | 13.4 | 13.4 | 13.4 |
| H − (Sp × 0.25) | 1.25 to 2.25 | 1.25 to 2.25 | 1.25 to 2.25 | 1.25 to 2.25 | 1.25 to 2.25 | 1.25 to 2.25 | 1.25 to 2.25 | 1.25 to 2.25 | 2.55 | 2.15 | 2.15 | 2.15 |
| Sr (specific surface area of the resin particles, $m^2/g$) | 35.0 | 31.0 | 45.0 | 25.0 | 50.0 | 20.0 | 55.0 | — | 25.0 | 50.0 | — | 35.0 |
| Sr − (Sp × 0.75) | 11.75 | 7.75 | 21.75 | 1.75 | 26.75 | −3.25 | 31.75 | — | 13.75 | 16.25 | — | 1.25 |
| Print stability | A | B | B | C | C | D | D | A | B | B | B | D |
| Fastness of prints | A | A | A | A | A | A | A | B | A | A | B | A |

TABLE 2

|  | Examples | | | | | | | | | | Comparative Examples | |
| --- | --- | --- | --- | --- | --- | --- | --- | --- | --- | --- | --- | --- |
|  | 13 | 14 | 15 | 16 | 17 | 18 | 19 | 20 | 21 | 22 | 1 | 2 |
| Pigment dispersion A |  |  | 6.0 | 6.0 | 6.0 | 6.0 | 6.0 | 6.0 | 6.0 | 6.0 |  |  |
| Pigment dispersion B |  |  |  |  |  |  |  |  |  |  |  |  |
| Pigment dispersion C |  |  |  |  |  |  |  |  |  |  |  |  |
| Pigment dispersion D | 6.0 |  |  |  |  |  |  |  |  |  |  |  |
| Pigment dispersion E |  | 6.0 |  |  |  |  |  |  |  |  |  |  |
| Pigment dispersion F |  |  |  |  |  |  |  |  |  |  | 6.0 |  |
| Pigment dispersion G |  |  |  |  |  |  |  |  |  |  |  | 6.0 |
| NEWCOL 1820 (HLB: 15.3) |  |  |  |  |  |  |  |  |  |  |  | 0.5 |
| NEWCOL 1008 (HLB: 14.6) |  | 0.5 |  |  |  |  |  |  |  | 0.5 |  |  |
| NEWCOL 1006 (HLB: 13.4) |  |  |  |  |  |  |  |  |  |  |  |  |
| NEWCOL 1004 (HLB: 11.5) |  |  |  |  |  |  |  | 0.5 |  |  |  |  |
| NEWCOL 1807 (HLB: 10.7) |  |  |  | 0.5 | 0.5 | 0.5 |  |  |  |  |  |  |
| OLFINE PD-002W (HLB: 9 to 10) |  |  |  |  |  |  |  |  |  |  |  |  |
| NEWCOL 2303 (HLB: 8.3) |  |  | 0.5 |  |  |  |  |  |  |  |  |  |
| NEWCOL 1204 (HLB: 7.9) |  |  |  |  |  |  | 0.5 |  |  |  |  |  |
| NEWCOL 2302 (HLB: 6.3) |  |  |  |  |  |  |  |  |  |  |  |  |
| SURFYNOL 104PG50 (HLB: 4) | 0.5 |  |  |  |  |  |  |  | 0.5 |  | 0.5 |  |
| Resin particles A |  |  | 2.0 | 2.0 |  | 2.0 | 2.0 | 2.0 | 2.0 |  |  |  |
| Resin particles B |  |  |  |  |  |  |  |  |  |  |  |  |
| Resin particles C |  |  |  |  |  |  |  |  |  |  |  |  |
| Resin particles D |  |  |  |  |  |  |  |  |  |  |  |  |
| Resin particles E |  | 2.0 |  |  |  |  |  |  |  |  |  |  |
| Resin particles F | 2.0 |  |  |  |  |  |  |  |  |  | 2.0 |  |
| Resin particles G |  |  |  |  |  | 2.0 |  |  |  |  |  | 2.0 |
| Glycerol | 15.0 | 15.0 | 15.0 | 15.0 | 15.0 | 15.0 | 15.0 | 15.0 | 15.0 | 15.0 | 15.0 | 15.0 |
| Triethylene glycol monobutyl ether | 8.0 | 8.0 | 8.0 | 8.0 | 8.0 | 8.0 | 8.0 | 8.0 | 8.0 | 8.0 | 8.0 | 8.0 |
| Triethanolamine | 1.0 | 1.0 | 1.0 | 1.0 | 1.0 | 1.0 | 1.0 | 1.0 | 1.0 | 1.0 | 1.0 | 1.0 |
| Purified water | Balance | Balance | Balance | Balance | Balance | Balance | Balance | Balance | Balance | Balance | Balance | Balance |
| Sp (specific surface area of the pigment, $m^2/g$) | 10.0 | 50.0 | 31.0 | 31.0 | 31.0 | 31.0 | 31.0 | 31.0 | 31.0 | 31.0 | 5.0 | 55.0 |
| H (HLB of the nonionic surfactant) | 4.0 | 14.6 | 8.3 | 10.7 | 10.7 | 10.7 | 7.9 | 11.5 | 4.0 | 14.6 | 4.0 | 15.3 |
| H − (Sp × 0.25) | 1.50 | 2.10 | 0.55 | 2.95 | 2.95 | 2.95 | 0.15 | 3.75 | −3.75 | 6.85 | 2.75 | 1.55 |
| Sr (specific surface area of the resin particles, $m^2/g$) | 20.0 | 50.0 | 35.0 | 35.0 | — | 55.0 | 35.0 | 35.0 | 35.0 | 35.0 | 20.0 | 55.0 |
| Sr − (Sp × 0.75) | 12.50 | 12.50 | 11.75 | 11.75 | — | 31.75 | 11.75 | 11.75 | 11.75 | 11.75 | 16.25 | 13.75 |
| Print stability | C | C | B | B | B | D | C | C | D | D | E | E |
| Fastness of prints | A | A | A | A | B | A | A | A | A | A | A | A |

Print Stability

Each ink composition was loaded into an ink cartridge of an ink jet printer (Seiko Epson Corporation, trade name "PX-M7050") and subjected to printing on A4 plain paper under the room temperature, atmospheric pressure, and 100% duty conditions. A nozzle-check pattern was printed once every ten sheets, and print stability was evaluated against the criteria below. The results are presented in Tables 1 and 2.

Evaluation Criteria

A: No misdirection was observed after the printing of 500 sheets.

B: Misdirection was not observed after the printing of 200 sheets but observed after between 210 and 500 sheets.

C: Misdirection was not observed after the printing of 100 sheets but observed after between 110 and 200 sheets.

D: Misdirection was not observed after the printing of 50 sheets but observed after between 60 and 100 sheets.

E: Misdirection was observed after the printing of 50 sheets.

Fastness of Print

Each ink composition was loaded into an ink cartridge of an ink jet printer (Seiko Epson Corporation, trade name "PX-M7050") and subjected to printing of the print data specified in ISO/IEC 24734 on Xerox-P paper at room temperature and atmospheric pressure. An area of the printed portion was marked with a highlighter pen (ZEBRA "OPTEX CARE"), and the fastness of the print was evaluated against the criteria below. The results are presented in Tables 1 and 2.

Evaluation Criteria

A: No bleed was observed after the second stroke of marking.

B: Bleed was not observed after the first stroke of marking but was observed after the second.

The entire disclosure of Japanese Patent Application No. 2017-048252, filed Mar. 14, 2017 is expressly incorporated by reference herein.

What is claimed is:

1. An ink composition comprising:
water;
at least one surfactant;
resin particles having a core-shell structure; and
a pigment,
wherein the pigment has a specific surface area of 10 m$^2$/g or more and 50 m$^2$/g or less as determined by pulsed NMR at 30° C.; and
wherein the resin particles have a specific surface area that satisfies relation (2) as determined by pulsed NMR at 30° C.:

$$1.75 \leq Sr - (Sp \times 0.75) \leq 26.75 \tag{2},$$

where $Sr$ denotes a specific surface area (m$^2$/g) of the resin particles, and $Sp$ denotes the specific surface area (m$^2$/g) of the pigment.

2. The ink composition according to claim 1, wherein the at least one surfactant includes a nonionic surfactant that satisfies relation (1):

$$0.15 \leq H - (Sp \times 0.25) \leq 3.75 \tag{1}$$

where $H$ denotes an HLB of the nonionic surfactant, and $Sp$ denotes the specific surface area (m$^2$/g) of the pigment.

3. A recording method comprising attaching the ink composition according to claim 1 to a substrate.

4. A recording method comprising attaching the ink composition according to claim 2 to a substrate.

* * * * *